United States Patent [19]
Shucosky et al.

[11] Patent Number: 5,855,783
[45] Date of Patent: Jan. 5, 1999

[54] PLEATED POLY(TETRA-FLUORO ETHYLENE) FILTER CARTRIDGE

[75] Inventors: Anthony C. Shucosky, Timonium, Md.; William P. Seeley, Shrewsbury, Pa.

[73] Assignee: Memtec America Corporation, Timoinum, Md.

[21] Appl. No.: 240,505

[22] Filed: May 10, 1994

Related U.S. Application Data

[63] Continuation of Ser. No. 883,122, May 14, 1992, abandoned, which is a continuation-in-part of Ser. No. 792,621, Nov. 15, 1991, abandoned.

[51] Int. Cl.[6] .......................... B01D 27/06; B01D 39/18
[52] U.S. Cl. ................................ 210/493.1; 210/493.5; 210/500.27; 210/500.42; 55/497; 55/498; 55/500; 55/521
[58] Field of Search .................... 210/489, 484, 210/488, 493.1, 493.2, 493.5, 500.27, 500.42; 55/486, 497, 498, 500, 521

[56] References Cited

U.S. PATENT DOCUMENTS

| | | | |
|---|---|---|---|
| 5,154,827 | 10/1992 | Ashelin et al. | 210/490 |
| 5,158,680 | 10/1992 | Kawai et al. | 210/450 |

*Primary Examiner*—W. L. Walker
*Attorney, Agent, or Firm*—Waldron & Associates

[57] ABSTRACT

A pleated, all poly(tetra-fluoro ethylene) filter element (20) incorporating a poly(tetra-fluoro ethylene) filter membrane (24) is shown and described. The membrane is supported by an all poly(tetra-fluoro ethylene) paper (26) and (28), which permits filtrate to pass through the paper and across the poly(tetrafluoro ethylene) membrane. A sandwich is formed by placing a layer of poly(tetra-fluoro ethylene) filter membrane (24) between the two layers of poly(tetra-fluoro ethylene) support paper, (26) and (28), and the sandwich is then pleated prior to assembly around a core (14) and between end caps (12) and (18), which are bonded to the poly(tetra-fluoro ethylene) paper and poly(tetrafluoro ethylene) filter membrane by a hot-melt process.

5 Claims, 3 Drawing Sheets

PLEATED POLY(TETRA-FLUORO ETHYLENE) FILTER CARTRIDGE

This is a continuation, of application Ser. No. 07/883,122, filed May 14, 1992, now abandoned which is in turn a continuation in part of application Ser. No. 07/792,621, filed Nov. 15, 1991, now abandoned benefit of which are hereby claimed under 35 USC 120.

BACKGROUND OF THE INVENTION

1. Field of the Invention

This invention relates to the field of filter elements constructed with poly(tetra-fluoro ethylene); i.e., "PTFE" resin membranes. Membranes made of poly(tetra-fluoro ethylene), such as Teflon®, are used for filtration in the fields of foods, semi-conductors, and the like. These filters are also used in fields where highly reactive chemicals are in use.

2. Related Case

3. The Prior Art

Poly(tetra-fluoro ethylene) membrane filters, in a variety of constructions have proven attractive in a variety of fields where the unique properties of poly(tetra-fluoro ethylene) resins afford particular advantage. Among the virtues of poly(tetra-fluoro ethylene) materials are the chemical inertness and high temperature characteristics.

Poly(tetra-fluoro ethylene) membranes are based on stretching, often biaxially, a film of the polymer. Such materials are commercially available from a variety of sources, in a range of properties such as pore diameter, thickness, engineering properties and the like.

Filter cartridges of pleated poly(tetra-fluoro ethylene) membranes are known in the art and have proven to be of considerable use, both for the particular properties of the poly(tetra-fluoro ethylene) membrane and for the facility and convenience of the cartridge form.

As those of ordinary skill in the art understand, it is desirable to minimize the use of materials other than poly(tetra-fluoro ethylene) in the fabrication of such pleated membrane cartridges. While it has not proven possible to date to eliminate all materials other than poly(tetra-fluoro ethylene) in such cartridges, it has been possible to substitute other fluorocarbon polymers which offer some of the properties of poly tetra-fluoro ethylene), in combination with true thermoplastic characteristics which enable the fabrication of pleated membrane cartridges.

Poly(tetra-fluoro ethylene) membranes require structural support to withstand the stresses of filtration. In pleated cartridges, the membrane is ordinarily sandwiched between porous webs of other materials which provide adequate structural characteristics to protect the membrane.

Such pleated membrane filter cartridges made wholly of fluorocarbon resins are known in the prior art as illustrated in U.S. Pat. No. 4,663,041, issued to Miyagi, et al. Miyagi, et al. teach the use of a poly(tetra-fluoro ethylene) membrane as the essential filter medium. The filter element is produced by pleating a sandwich-form shape comprising a filter membrane made of poly(tetra-fluoro ethylene) resin and fluorocarbon thermoplastic polymer net mesh supports extruded of thermoplastic fluorocarbon resin superimposed on both surfaces thereof. The material is then formed into a pleat and hot melt bonded at the edges of the pleats into a cylinder. Such extruded mesh netting of poly(tetra-fluoro ethylene) is not known, and other fluoropolymers, such as TFE, PFA, FEP, ETFE, PVDF, ECTFE, PVT, and blends of such thermoplastic fluoropolymers are employed.

Another example of a prior art fluorocarbon filter is found in United Kingdom patent application GB 2,152,399A, Flaherty, et al., published Aug. 7, 1985, wherein a filter medium is constructed using a membrane and screen sandwiched together. This disclosure is quite close to Miyagi, et al., supra, with whom Flaherty, et al., is presently involved in an Interference. The extruded fluoropolymer screen provides structural support for the poly(tetra-fluoro ethylene) membrane. The import of Flaherty, et al., is cumulative to that of Miyagi, et al.

The extruded fluorocarbon thermoplastic polymer mesh or net screens employed by Miyagi, et al., and by Flaherty, et al., have several disadvantages. The thermoplastic fluoropolymer is not poly(tetra-fluoro ethylene), first and foremost, and cannot offer the chemical inertness, thermal stability and related properties afforded by poly(tetra-fluoro ethylene). In addition, such extruded screens are relatively thick, on the order of about 0.3 mm to about 0.75 mm. As a consequence, the effective surface area of the poly(tetra-fluoro ethylene) membrane in the pleated structure is limited by the bulk of the non-poly(tetra-fluoro ethylene) support.

Another attempt to construct a porous fibrous fluorocarbon filter is shown in U.S. Pat. No. 4,716,074, issued to Hurley, et al. In this structure, poly(tetra-fluro ethylene), PTFE fibers are assembled into a web with a fluorocarbon binder. The fluorocarbon binder is cured in order to hold the poly(tetra-fluoro ethylene) in place.

The poly(tetra-fluoro ethylene) web taught by Hurley, et al., employs lesser amounts of material other than poly(tetra-fluoro ethylene), and is relatively thin. The fluoropolymer adhesive relied upon to bond the web has the great disadvantage of becoming dislodged, however, as an inherent characteristic of adhesives or other materials bonded to the surface of poly(tetra-fluoro ethylene) materials, noted for their "non-stick" properties. As a consequence, the Hurley, et al., web results in a contamination of the filtrate with loosened bits of the fluoropolymer adhesive and, in some cases, with loosened poly(tetra-fluoro ethylene) fibers. In the uses for which such cartridges are most often employed, such filtrate contamination is unacceptable.

In Japanese patent JP 63165598, there is disclosed a method of construction of a fluorofiber paper. A fluorofiber paper (PTFE paper) is constructed by orienting fluorofibers in random directions and bonding them together by hot melt bonding. The manufacturing method comprises making a fluorofiber containing paper by subjecting the fluorofibers and temporary extractable binding agent to wet-mix paper making, drying, and then hot-pressing the paper at the softening point of the thermoplastic fluorofiber or at a higher temperature to hot-glue them together. Next, the temporary extractable binding agent is removed by dissolving it with a solvent and washing, and re-drying if necessary. By this method, a fluorofiber web is constructed. The fluorofiber disclosed can be PTFE, TFE, PFA, FEP, ETFE, PVDF, ECTFE, PVT, and blends thereof.

This application discloses that a fluorofiber paper is obtained which exhibits superior characteristics of fluororesins such as heat resistance, chemical resistance, noncombustibility, electrical insulation, and non-stickiness. The paper may be used in various applications such as filter media, heat insulation materials, spacers, insulation materials, and non-sticking materials in diverse industrial fields. The application, however, makes no disclosure as to the strength of poly(tetra-fluoro ethylene) paper or of properties suitable for support of membranes in pleated cartridge construction. Because poly(tetra-fluoro ethylene) is not readily processed by thermoplastic techniques, it is unclear that poly(tetra-fluoro ethylene) fibers are contemplated for use per se or only in blends with other thermoplastic fluorocarbon polymers.

As no example is given which employs poly(tetra-fluoro ethylene) fibers, and little information or guidance is provided concerning the use of poly(tetra-fluoro ethylene) fibers in the invention, it is not apparent from Japanese Patent JP 63165598 that the requirements of a membrane support medium are provided. The suggestion of usage as a filter medium implicitly suggests, to those of ordinary skill in the art, that a support should be considered if the paper is employed in such usage.

The art has recognized the limitations and shortcomings of the fluoropolymer mesh support employed by Miyagi, et al., and by Flaherty, et al., but efforts eliminate non-PTFE components and constituents completely from the support have not heretofore succeeded.

In the Hurley, et al., effort to improve on the extruded mesh support, the physical demands imposed on the support structure in filtration service led to reliance on adhesives to bond poly(tetra-fluoro ethylene) fibers into a web. As already noted, the familiar non-stick properties of poly(tetra-fluoro ethylene) materials has led to sloughing of particles of the adhesive material, and ultimately of poly(tetra-fluoro ethylene) fibers, into the filtrate. Such filtrate contamination is quite unacceptable in most applications for poly(tetra-fluoro ethylene) membrane filter cartridges and has severely circumscribed the acceptance of the Hurley, et al., product.

The desirability of an all poly(tetra-fluoro ethylene) filter medium, based on both membrane and support made from all-PTFE materials, and free of other, non-PTFE, materials has, until the present invention, remained unfilled.

SUMMARY OF THE INVENTION

It is an object of the present invention to eliminate all non-PTFE materials from the filter and support of pleated filter cartridges.

Another object of the present invention is to provide a poly(tetra-fluoro ethylene) membrane filter medium with an all poly(tetra-fluoro ethylene) support.

Still another object is to provide an all poly(tetra-fluoro ethylene) support for poly(tetra-fluoro ethylene) membranes having a thickness of less than about 0.2 mm, and preferably about 0.075 to about 0.125 mm, and typically about 0.1 mm.

Another object is to increase the effective filtration area of poly(tetra-fluoro ethylene) membrane pleated filter cartridges by reducing the thickness of the membrane support.

This invention utilizes a poly(tetra-fluoro ethylene) paper to support a poly(tetra-fluoro ethylene) membrane filter. The poly(tetra-fluoro ethylene) paper and the poly(tetra-fluoro ethylene) membrane form a sandwich structure with the membrane between two layers of poly(tetra-fluoro ethylene) paper. The filter media are folded and crimped into a pleated filter element which is wrapped around a suitable core, usually molded of a PFA or similar thermoplastic fluoropolymer resin. The ends of the filter element are joined to a PFA or similar thermoplastic fluoropolymer end cap and PFA or similar thermoplastic fluoropolymer end adaptor by means of a hot melt process, which embeds the filter element edges in an adhesive bond to the end cap and adaptor, by thermoplastic bonding with a FEP film, which acts as a hot melt adhesive. A side seam in the element can be formed in similar fashion. The cartridge thus formed is desirably formed within a protective PFA or similar thermoplastic fluoropolymer cage. In the present invention, a thermoplastic fluorocarbon polymer is employed as the hot melt adhesive for potting the ends of the pleated media in a fluid-tight seal to the end caps, and in forming the required side seam. The hot melt adhesive is the sole component of the pleated filter element of the present invention which is not poly (tetra-fluoro ethylene).

The poly(tetra-fluoro ethylene) paper is rigid enough to permit pleating and wrapping around a central core member. The poly(tetra-fluoro ethylene) paper is sufficiently strong that it does not require additional support of other materials to provide structural support when a pressure differential exists across the filter. Therefor, by this invention, there is provided a pure poly(tetra-fluoro ethylene) membrane filter element, not requiring support or reinforcements by use of other materials or bonded by non-PTFE adhesives (excepting only the end cap and side seam bonds) in order to provide membrane filter medium support.

BRIEF DESCRIPTION OF THE DRAWINGS

FIG. 2 illustrates a different form of end cap (12) and adaptor (18) from those illustrated in FIG. 1.

DETAILED DESCRIPTION OF THE PREFERRED EMBODIMENT

Figure 1:
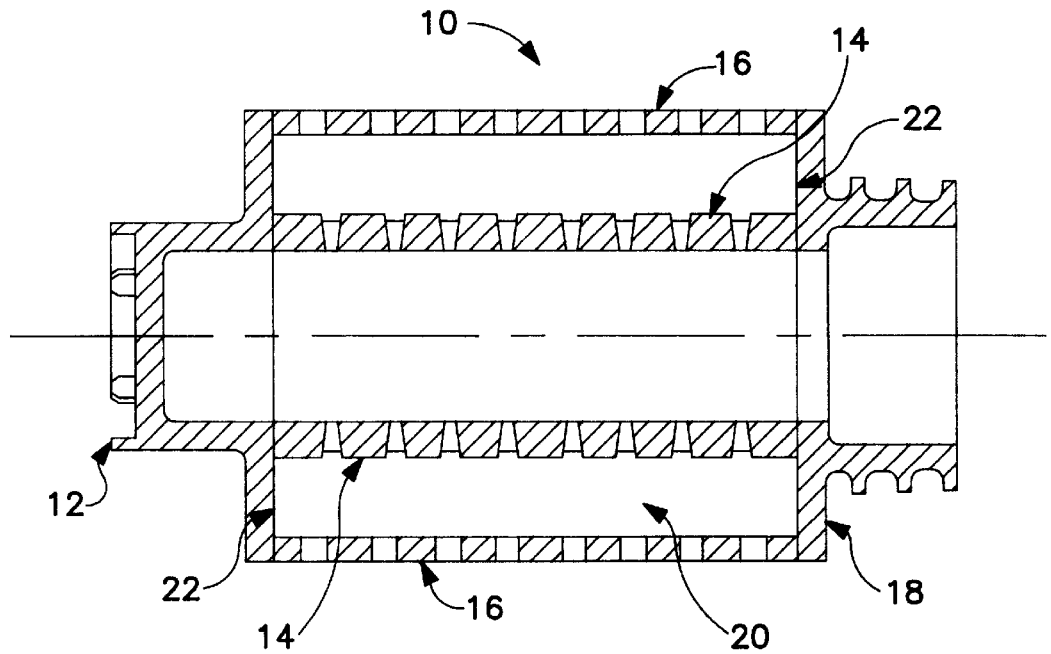
FIG. 1 depicts a cross-sectional view of a filter in accordance with this invention.
Figure 2:
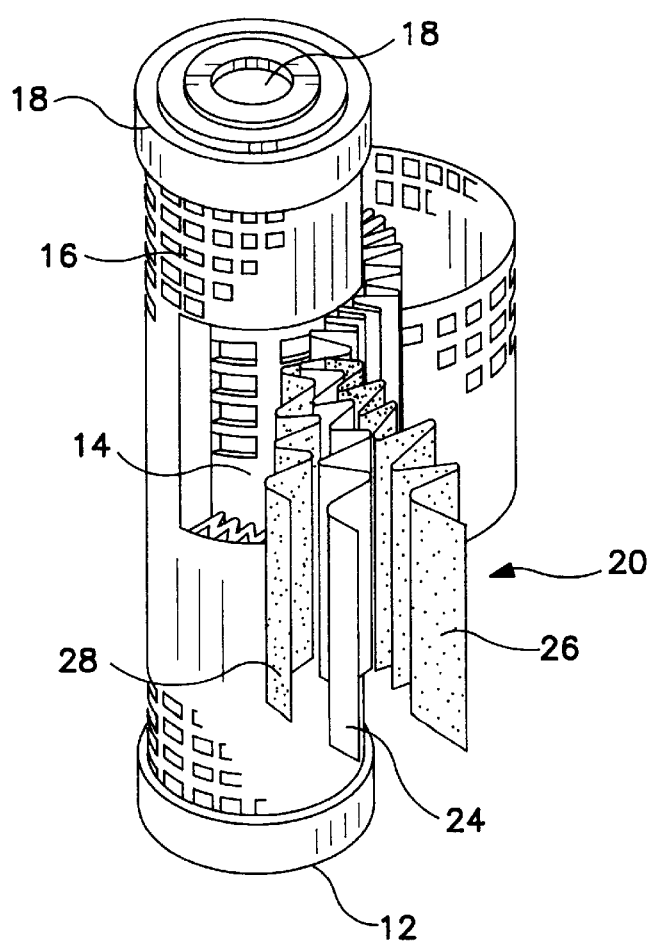
FIG. 2 shows a perspective, partially exploded view of a filter cartridge in accordance with the present invention.
Figure 3A:
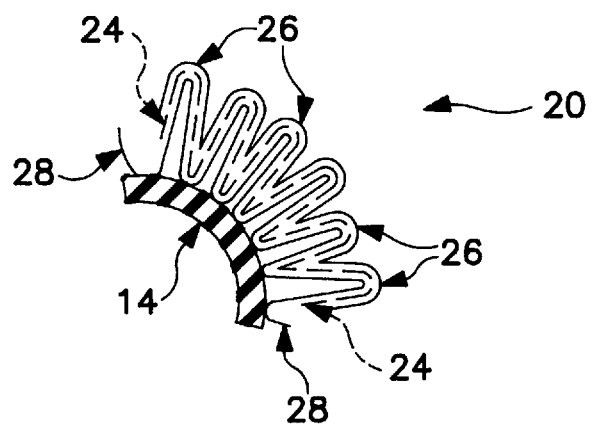
FIGS. 3a and 3b show a partial section of the pleated media filter element and the core which supports the filter and the make-up of the membrane and support which are pleated to form the element.
Figure 3B:
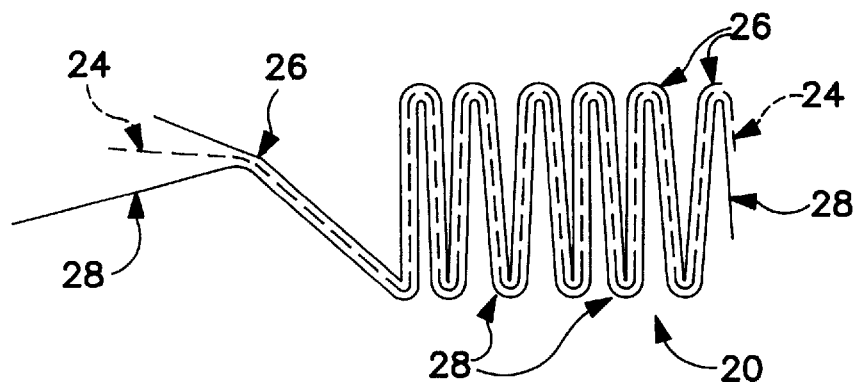
Figure 4:
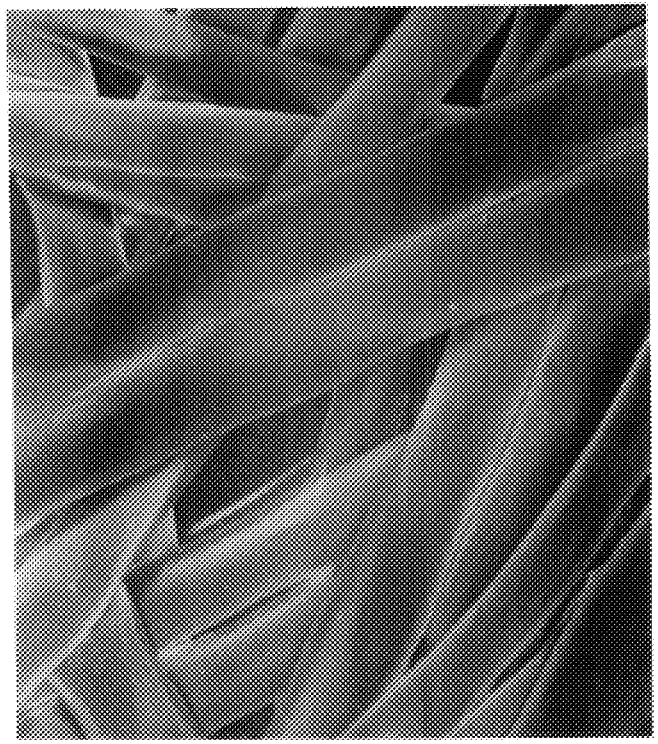
FIG. 4 shows a 300× magnification of the poly(tetra-fluoro ethylene) paper mat used to support a poly(tetra-fluoro ethylene) membrane filter constructed in accordance with the present invention.
Figure 5:
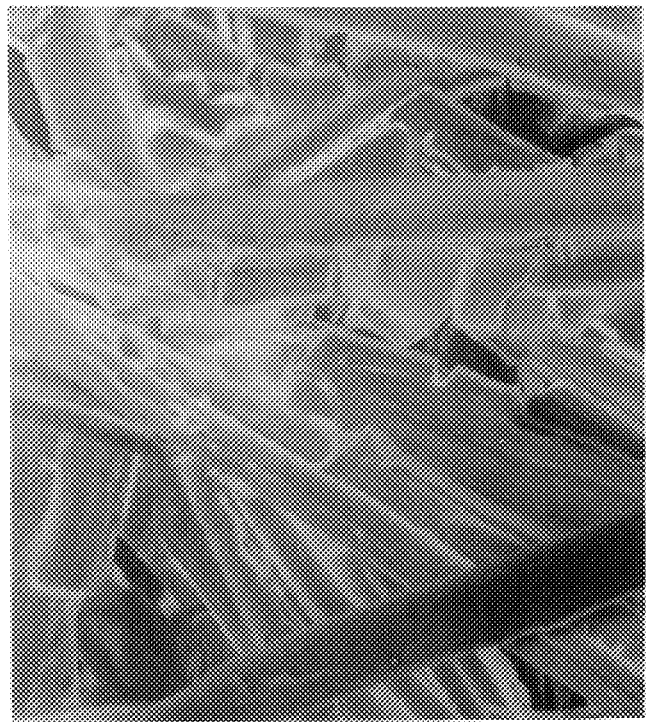
FIG. 5 shows a 300× magnification of a prior art poly (tetra-fluoro ethylene) filter membrane support using an adhesive binder to hold the fibers together, as disclosed by Hurley, et al.

In FIG. 1 there is shown a cross-section of a filter (10) constructed in accordance with this invention. The filter element (20) is constructed as a pleated sandwich of poly (tetra-fluoro ethylene) membrane (24), supported by two layers of poly(tetra-fluoro ethylene) paper web (26) and (28) which have sufficient rigidity to maintain its position as fluid flows across the filter. The pleated element (20), made up of the membrane (24) and the poly(tetra-fluoro ethylene) paper (26) and (28), is supported on a molded PFA or similar thermoplastic fluoropolymer core (14) which has holes or slots to permit passage of fluid. A molded PFA or similar thermoplastic fluoropolymer cage (16) surrounds the poly (tetra-fluoro ethylene) pleated filter element (20) and also includes holes for passage of fluid. A molded PFA or similar thermoplastic fluoropolymer end cap (12) and molded PFA or similar thermoplastic fluoropolymer adaptor end (18) are assembled to the cage (16), the core (14), and the pleated filter element (20) by means of a hot melt bond. The adaptor end (18) may be constructed to connect to any suitable fluid flow connector adapted to engage and seal in industry standard or commonly employed filter housings. As shown in FIG. 3b, the poly(tetra-fluoro ethylene) membrane (24) is supported between the layers of the poly(tetra-fluoro ethylene) paper in element (20).

The hot melt adhesive forms a bond with the edges of the poly(tetra-fluoro ethylene) paper which prevents fluid flow around the ends of the paper in the regions (22) defined by the end cap, adaptor end and the edges of the paper.

The layered poly(tetra-fluoro ethylene) membrane and poly(tetra-fluoro ethylene) paper support element (20) are joined together along their edges by a process wherein a hot-melt adhesive is used to bond the poly(tetra-fluoro ethylene) layers. The bond to the end cap (12) and to the adaptor end (18) is an adhesive bond wherein hot melt adhesive material may flow into pores of the paper and the membrane filter element during bonding.

The poly(tetra-fluoro ethylene) membrane as used in this invention is commercially available from a variety of sources under a variety of tradenames and trademarks, including, for example, Goretex®, a product available from W. L. Gore & Co., Inc.

The dimensions of the components will ordinarily be sized to fit common and industry standard filter housings, as those of ordinary skill in the art will readily appreciate. The specific design and configuration of the core, the cage, the end cap and the adaptor (i.e., an end cap adapted to sealably mate with a filter housing) are not critical and designs common to the industry and known to those of ordinary skill in the art may be employed.

This invention uses poly(tetra-fluoro ethylene) paper made by mixing poly(tetra-fluoro ethylene) fibers with temporary extractable binding agent using a wet-papermaking method, then drying to obtain the poly(tetra-fluoro ethylene) fiber containing paper which allows handling. The poly (tetra-fluoro ethylene) paper is thermoplastically bonded at the softening point temperature or higher temperature of the poly(tetra-fluoro ethylene) fibers to obtain moisture resistant heavy-duty paper. Next, the paper is immersed in a solvent which dissolves the temporary extractable binding agent used in the wet-papermaking process. The last step is removing the temporary extractable binding agent from the paper by washing it in a solvent, and then drying it.

The hot melt thermoplastic fluoropolymer adhesives used in this invention employed to bond the end cap (12) and adaptor end (18) are made of thermoplastic fluororesins, the main component of which can be TFE, PFA, FEP, ETFE, PVDG, ECTFE, PVF, and the like. A combination or blend of two or more may also be used.

In this invention, since we employ a wet-papermaking method to process the poly(tetra-fluoro ethylene) fibers into a paper form, the fibers should be relatively short fibers of 1 to 20 mm in length and the fiber diameter should preferably be 2 to 30 micrometers. If the fiber length is too short, the strength of the resulting paper will be compromised, and if it is too long, paper formation becomes irregular. Also, if the fiber diameter is too thin, the fibers tend to be twisted and distort the paper, and if it is too thick, the sheets become rough and may damage the poly(tetra-fluoro ethylene) membrane.

For the temporary extractable binding agent, natural pulp which is made of plant fibers such as wood, cotton, hemp and rice straw, synthetic pulp, and synthetic fibers made of thermoplastic synthetic polymers such as PVA, polyesters, aromatic polyamides, acrylics and polyolefins, and paper reenforcing agents made of natural polymers or synthetic polymers for paper-making industries may be used. The choice is not limited to the above-listed materials as long as the material has a temporary binding function and can be mixed with poly(tetra-fluoro ethylene) fibers and dispersed in water.

The first step in making the poly(tetra-fluoro ethylene) paper is to disaggregate and disperse the poly(tetra-fluoro ethylene) fibers and the temporary extractable binding agent into water with a suitable mixing ratio. Then, the dispersed materials are processed in a wet papermaking machine. The beating process, which is done for conventional cellulose fiber paper just before papermaking, is not ordinarily necessary but may be employed if desired. Prior art wet papermaking methods, without any limitation on the types of machines and such, may be used. Wet papermaking methods give the easiest way to disperse and mix poly(tetra-fluoro ethylene) fibers and temporary extractable binding agent with water as the medium. Also, wet papermaking methods allow control of the process by adding ingredients such as surfactants and tackifiers and are the most effective methods of obtaining paper with a homogeneous formation.

Then, thermocompression bonding is applied to secure the poly(tetra-fluoro ethylene) fibers in the poly(tetra-fluoro ethylene) fiber-containing paper to one another for interfiber bonding. Prior art technology such as hot pressing or hot rolling may be used for this process. The temperature for this process must be set at the softening point of the poly(tetra-fluoro ethylene) fiber or higher, usually 360° to 380° C. In this process, the conditions such as the nip pressure and pressurizing dwell time should be set based on the, hardness of the fiber, and the fiber diameter. Thermocompression bonding treatment with this temperature setting gives bonding between poly(tetra-fluoro ethylene) fibers by thermoplastic hot melt bonding at the contact points between fibers.

The next step is to remove the temporary extractable binding agent from the thermocompression bonded poly (tetra-fluoro ethylene) fiber containing paper by dissolving it into a solvent. Since poly(tetra-fluoro ethylene) fiber is resistant to a wide variety of chemicals, the solvent can be selected based on the type of the temporary extractable binding agent. For example, if the temporary extractable binding agent is wood pulp, then an inorganic acid, such as concentrated sulfuric or hydrochloric acids, is used as the solvent, and in the case of PVA fiber, warm water is used as the solvent. The dissolution removal conditions, such as solvent agitation, heating, and circulation, are determined based on productivity and convenience. The temporary extractable binding agent is removed and then the paper is washed with water or the like and dried to obtain the poly(tetra-fluoro ethylene) fiber paper.

In addition, poly(tetra-fluoro ethylene) fiber paper with specific physical properties can be obtained by controlling the fiber diameter, fiber length, mixing ratio, papermaking conditions, thermocompression bonding conditions, and the like.

It is generally desirable that the tensile strength of the PTFE fiber papers be greater than about 0.4 kg for a standard 15 mm tensile test specimen. The elongation at break will ordinarily be on the order of about 300%.

It is also desirable that the physical properties be achieved at the least possible thickness, in order to minimize the bulk necessary to perform effectively and thus to maximize the number of pleats in the cartridge and the effective filtration surface area. It has been found that the necessary tensile properties are attained reliably at paper thicknesses less than about 0.125 mm when the paper contains a finished weight of PTFE fibers in the range of about 80 to 100 g/m$^2$, preferably about 85 to 95 g/m$^2$.

The PTFE fiber paper should be highly porous, to minimize resistance to flow through the cartridge, but not so open that the PTFE membrane is not adequately supported. It is desirable that the air permeability, as measured by the Gurley test, be on the order of from about 0.1 to about 0.3 seconds per 100 cc of air through 16 plies of the paper. A single ply of paper has such high permeability that effective and meaningful measurements can not be made by the Gurley test. Using the Frazier Air Permeability Test, the porosity should be greater than about 300 SCFM (Standard Cubic Feet per Minute), preferably from about 450 to about 400 SCFM.

The making of the poly(tetra-fluoro ethylene) paper employed in the present invention is further described in the following illustrative examples. The expression of proportions is based on weight.

EXAMPLE 1

Eighty parts of bleached poly(tetra-fluoro ethylene) fiber, with 10 micrometer diameter and 11 mm length, and 20 parts of cellulose pulp beaten to the beating degree of 40° SR are dispersed and mixed in water and the betaine type amphoteric surfactant which is 0.5% of the raw material (from here on indicating the poly(tetra-fluoro ethylene) fiber and pulp on a solids basis), is added, and disaggregation is conducted by an agitator with a raw material concentration of 0.5%. Then, an acrylamide dispersing agent (1% of the raw material), is added, sheets are made with a standard sheet laying machine, and the sheets are dried to obtain poly(tetra-fluoro ethylene) fiber containing paper having a weight of 115 g/m$^3$. This poly(tetra-fluoro ethylene) fiber containing paper is then heated and pressurized at 380° C. and 10 kg/cm$^2$ for 20 minutes, and immersed in 98% $H_2SO_4$ at room temperature to dissolve the pulp component in the poly(tetra-fluoro ethylene) fiber containing paper. After water washing and drying, the poly(tetra-fluoro ethylene) fiber paper is obtained.

EXAMPLE 2

Ninety parts of bleached poly(tetra-fluoro ethylene) fiber, with 10 micrometer diameter and 6 mm length, and 10 parts of PVA fiber are dispersed and mixed in water. A betaine type amphoteric surfactant, at 0.5% of the raw material, is added, and disaggregation is conducted by an agitator with a raw material concentration of 0.5%. Then an acrylamide dispersing agent, at 2% of the raw material, is added, sheets are made with a standard sheet laying machine, and the sheets are dried with a dryer to obtain poly(tetra-fluoro ethylene) fiber containing paper with a weight of 111 g/m$^3$. This poly(tetra-fluoro ethylene) fiber containing paper is then heated and pressurized at 380° C. and 10 kg/cm$^2$ for 20 minutes, and immersed in hot water at 90° C. to dissolve the PVA fiber. After water washing and drying, the poly(tetra-fluoro ethylene) fiber paper is obtained.

EXAMPLE 3

Ninety-five parts of bleached poly(tetra-fluoro ethylene) fiber, with 10 micrometer diameter and 5 mm length, and 5 parts of microfiber cellulose are dispersed and mixed in water and the betaine type amphoteric surfactant, at 0.5% of the raw material, is added, and disaggregation is conducted by an agitator with a raw material concentration of 0.5%. Then, an acrylamide dispersing agent, at 2% of the raw material, is added, sheets are made with a standard sheet laying machine, and the sheets are dried to obtain poly(tetra-fluoro ethylene) fiber containing paper with a weight of 140 g/m$^2$. This poly(tetra-fluoro ethylene) fiber containing paper is then heated and pressurized at 380° C. and 10 kg/cm$^2$ for 20 minutes, and immersed in 98% $H_2SO_4$ at room temperature to dissolve the microfiber cellulose in the fluorofiber containing paper. After water washing and drying, the poly(tetra-fluoro ethylene) fiber paper is obtained.

EXAMPLE 4

After obtaining the poly(tetra-fluoro ethylene) fiber containing paper in the same way as Example 1, the paper is heated and pressurized on a hot rolling mill at 380° C., 200 kg/cm of nip length at a rate of 3 m/min, and then immersed in 98% $H_2SO_4$ at room temperature to dissolve the pulp component in the poly(tetra-fluoro ethylene) fiber containing paper. After water washing and re-drying, the poly(tetra-fluoro ethylene) fiber paper is obtained.

The poly(tetra-fluoro ethylene) fiber papers obtained in Examples 1 to 4, as described above, are sheets which have sufficient physical properties to be easily handled as normal paper. The physical properties of the paper are shown in Table 1. It is confirmed that the sheets show a porous paper layer structure with poly(tetra-fluoro ethylene) fibers (1) oriented in random directions which are thermoplastically bonded at fiber intersections (2). Microscopic observations and coloration reaction tests confirm that the pulp or PVA fiber which had been added as the temporary extractable binding agent is substantially removed, and no longer detectable.

TABLE 1

| Examples | 1 | 2 | 3 | 4 |
| --- | --- | --- | --- | --- |
| Thickness (mm) | 0.110 | 0.119 | 0.124 | 0.120 |
| Weight (g/m$^2$) | 89 | 92 | 83.1 | 92 |
| Density (g/cm$^3$) | 0.58 | 0.67 | 0.67 | 0.62 |
| Air permeability (sec/100 cc/16 plies)* | 0.1 | 0.25 | 0.2 | 0.2 |
| Tensile strength (kg/15 mm) | 0.56 | 0.42 | 0.47 | 0.55 |
| Elongation at break (%) | 300 | 310 | 310 | 300 |

*Because of the openness of the poly(tetra-fluoro ethylene) fiber papers of the present invention, the air permeability figures reported are for sixteen thicknesses of the paper. A single ply does not produce meaningful measures of permeability.

The poly(tetra-fluoro ethylene) papers obtained in Examples 1–4, containing no material other than the poly (tetra-fluoro ethylene) fibers bonded at their intersections by thermoplastic bonding free of all adhesives, exhibit surprising strength and engineering properties, as required to serve as a support for the poly(tetra-fluoro ethylene) membranes of the present invention.

The poly(tetra-fluoro ethylene) paper of Example 3 was tested for extractables by soaking in hot water at 121° C. for 20 hours. The results are shown in Table 2:

TABLE 2

| | |
| --- | --- |
| Na | <0.3 ppm |
| K | <0.1 ppm |
| Ca | <0.4 ppm |
| Mg | <0.1 ppm |
| Cu | <0.1 ppm |
| Fe | <0.1 ppm |
| Cl | <0.1 ppm |
| NO$_3$ | <0.1 ppm |

Five specimens of the paper were tested for porosity by the Frazier Air Permeability Test with the results shown in Table 3:

TABLE 3

| Sample Number | SCFM |
|---|---|
| 1. | 488 |
| 2. | 470 |
| 3. | 500 |
| 4. | 451 |
| 5. | 480 |

The same paper of Example 3 was evaluated for breaking strength and elongation to break on an Instron tensile testing machine. The test strips were cut to a width of 1 cm and produced the results shown in Table 4:

TABLE 4

| Breaking Strength (grams) | | Elongation (%) |
|---|---|---|
| X | 342 | 356 |
| R | 202 | 148 |
| S.D. | 9.8. | 61 |
| C.V. | 2.9. | 17 |

What is claimed is:

1. In a pleated filter cartridge having a poly(tetra-fluoro ethylene) membrane filter medium, the improvement comprising:
providing a continuous support web on both faces of said membrane and pleated with said membrane, wherein said web is a nonwoven paper of thermally bonded poly(tetra-fluoro ethylene) fibers, said web has a thickness of less than about 0.2 mm, and said web is substantially free of materials other than poly(tetra-fluoro ethylene).

2. In the pleated filter cartridge of claim 1, the further improvement wherein said poly(tetra-fluoro ethylene) fibers have a diameter of from about 2 μm to about 30 μm and a length of from about 1 mm to about 20 mm.

3. In the pleated filter cartridge of claim 1, the further improvement wherein said said web has a thickness of from about 0.075 mm to about 0.125 mm.

4. In the pleated filter cartridge of claim 1, the further improvement wherein said nonwoven paper has a tensile strength of at least about 0.5 kg per 15 mm of width.

5. In the pleated filter cartridge of claim 1, the further improvement wherein said web has a thickness of about 0.1 mm.

* * * * *